(12) United States Patent
Gargi et al.

(10) Patent No.: US 9,141,617 B1
(45) Date of Patent: Sep. 22, 2015

(54) SOCIAL LENS FOR SEARCH

(71) Applicant: Google Inc., Mountain View, CA (US)

(72) Inventors: Ullas Gargi, Sunnyvale, CA (US); Richard Gossweiler, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 257 days.

(21) Appl. No.: 13/662,289

(22) Filed: Oct. 26, 2012

(51) Int. Cl.
*G06F 7/00* (2006.01)
*G06F 17/30* (2006.01)

(52) U.S. Cl.
CPC .............................. *G06F 17/30029* (2013.01)

(58) Field of Classification Search
CPC ................................................ G06F 17/30029
USPC ..................................................... 707/732
See application file for complete search history.

(56) References Cited

U.S. PATENT DOCUMENTS

| | | | |
|---|---|---|---|
| 2009/0164450 A1* | 6/2009 | Martinez et al. | 707/5 |
| 2013/0036109 A1* | 2/2013 | Kulick et al. | 707/722 |

* cited by examiner

*Primary Examiner* — Ajith Jacob
(74) *Attorney, Agent, or Firm* — Fish & Richardson P.C.

(57) ABSTRACT

The subject matter of this specification can be implemented in, among other things, a method for refining search results. The method includes a step for receiving a request to refine search results, wherein the request identifies a first social circle to apply for refining the search results, wherein the first social circle comprises a preset group of contacts of a user within a social network service. The method also includes a step for retrieving search results based on the received request and a step for refining the retrieved search results based on the identified first social circle. The method also includes a step for providing at least a portion of the refined search results to an electronic device for display.

20 Claims, 9 Drawing Sheets

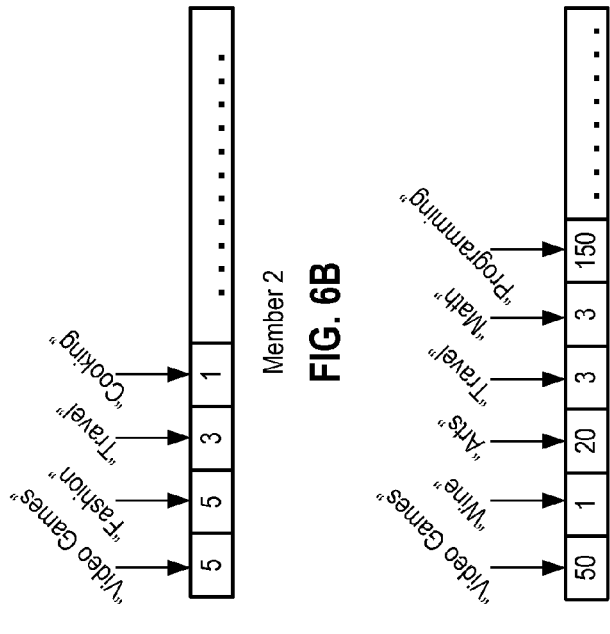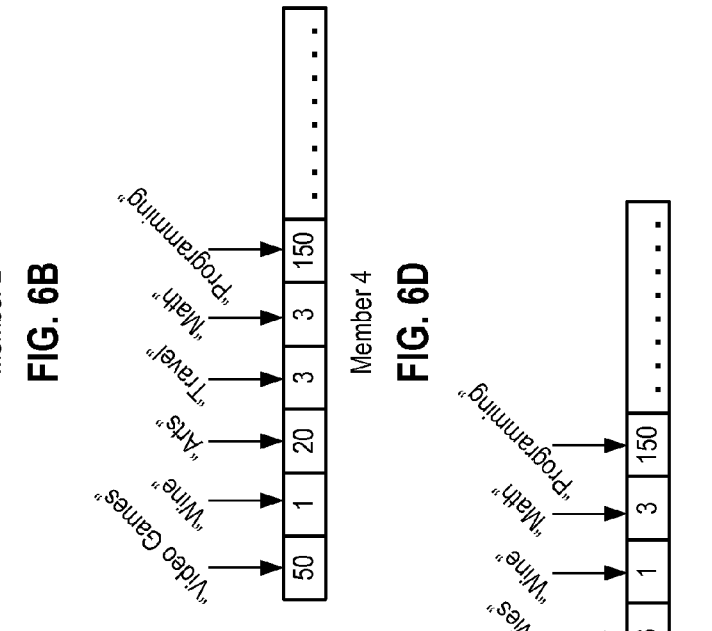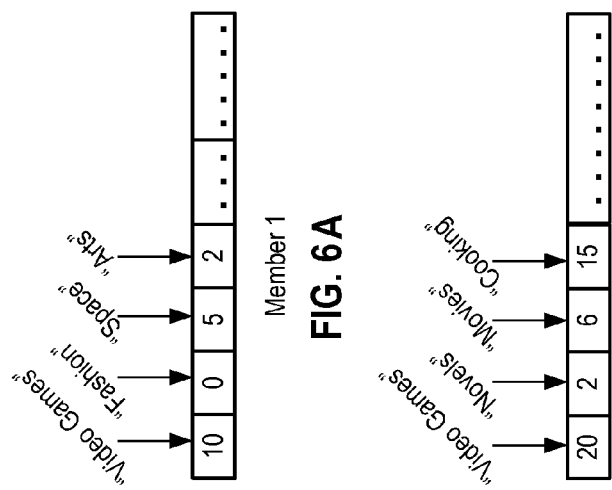

SOCIAL LENS FOR SEARCH

BACKGROUND

This instant specification relates to web searches, and in particular, to refining search results for web searches.

Web search results may be homogenous across large groups of people (e.g., in the same geography and language). In other words, the results for a particular search may be independent of the user for whom the search is being performed.

SUMMARY

In one aspect, the disclosed subject matter relates to a method for refining search results. The method includes a step for receiving a request to refine search results, wherein the request identifies a first group profile. The method also includes a step for retrieving search results based on the received search request and a step for refining the retrieved search results based on the identified first group profile. The method also includes a step for providing at least a portion of the refined search results to an electronic device for display. Other aspects can include corresponding systems, apparatus and computer program products.

These and other aspects can provide one or more of the following features. The first group profile may be based on a first social circle, wherein the first social circle comprises a preset group of contacts of a user within a social network service. The first group profile may be based on individual profiles of one or more contacts in the preset group of contacts for the first social circle. The refining of search results based on the identified first social circle may be based on a weighted characteristics of the identified first social circle. The refining may include either reordering or filtering of search results based on the weighted characteristics of the first social circle. The weighted characteristics may be maintained as a feature vector. The weighted characteristics of the first social circle may be based on the weighted characteristics of one or more members of the first social circle. The weighted characteristics of the one or more members of the first social circle may be based on web usage history of the respective one or more members.

These and other aspects can also provide one or more of the following features. The search results maybe further refined based on receiving a second indication of a second social circle. The refining based on the first and second social circles may take either the union or intersection of two search results, where each circle is individually applied. Also, the refining of search results based on the identified first social circle may include determining one or more sub-circles of the identified social circle, wherein the one or more sub-circles is based on other social circles of the one or more members of the identified first social circle and refining the search results by the determined one or more sub-circles of the identified first social circle.

The disclosed subject matter also relates to a machine-readable medium. The computer-readable medium includes instructions that when executed by a computer, cause the computer to implement a method for refining search results. The instructions include code for receiving a request to refine search results, wherein the request identifies a social lens to apply for refining the search results, wherein the social lens corresponds to a social circle of a user of a social networking platform, wherein the social circle comprises of a group of individuals. The instructions also include code for retrieving search results based on the received request. The instructions also include code for refining the retrieved search results based on the identified social lens. The instructions also include code for providing the refined search results to an electronic device for display. Other aspects can include corresponding systems, apparatus and computer program products.

The disclosed subject matter further relates to a system. The system includes one or more processors. The system also includes a memory, the memory having instructions which, when executed by the one or more processors, cause the one or more processors to implement a method for refining search results. The instructions include code for receiving a request to refine search results, wherein the request identifies a group of individual members to apply for refining the search results. The instructions also include code for retrieving search results based on the received request, wherein the retrieved search results are ranked in a first order. The instructions also include code for refining the retrieved search results based on the identified group of individual members; wherein the refining based on the identified group of individual members comprises re-ordering the retrieved search results by a second order based on aggregate characteristics of the identified group of individual members. The instructions also include code for providing at least a portion of the refined search results to an electronic device for display. Other aspects can include corresponding systems, apparatus and computer program products.

One advantage of applying social lenses for search refinement is the benefit of accumulated web search behavior applied to search results, for example, to help make search results more meaningful to users searching for information on the World Wide Web.

It is understood that other configurations of the subject technology will become readily apparent from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DESCRIPTION OF DRAWINGS

The features of the subject technology are set forth in the appended claims. However, for purpose of explanation, several aspects of the disclosed subject matter are set forth in the following figures.

FIGS. 6a-6e represent an example of a data construct to store information about characteristics of members of a group and of groups for a social lens-based search system.

DETAILED DESCRIPTION

Figure 1:
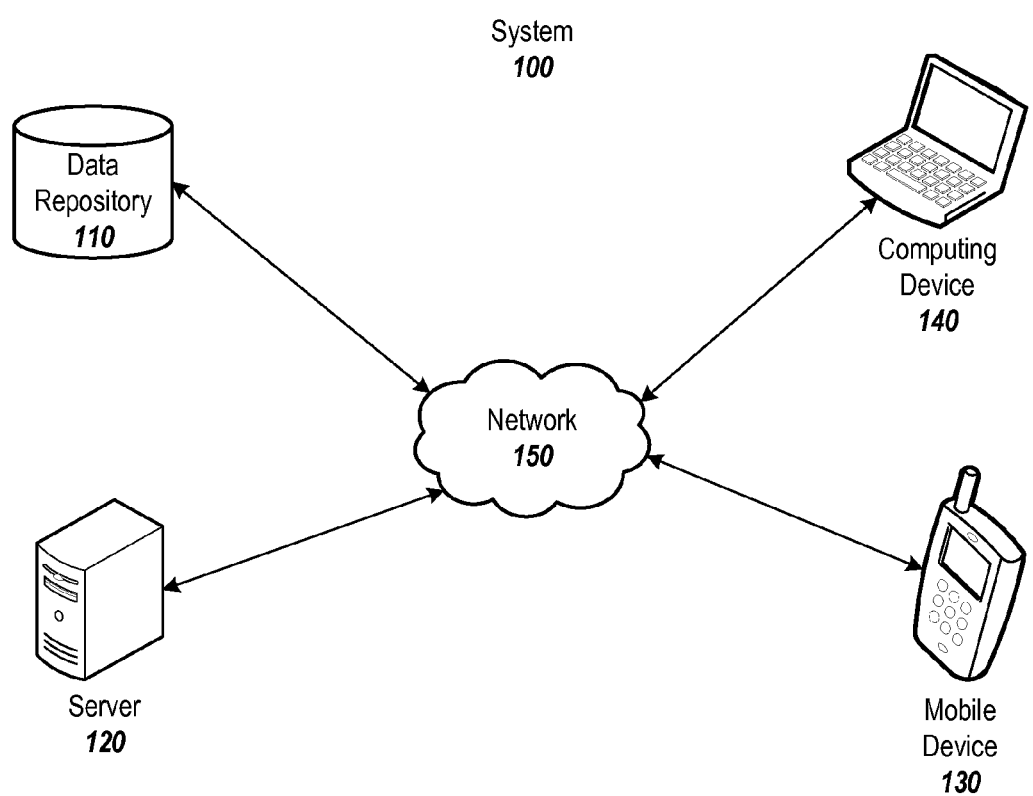
FIG. 1 illustrates an example of a computer system configured to provide a system for applying social lenses to search results.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, some structures and components are shown in block diagram form in order to avoid obscuring the concepts of the subject technology.

This document describes systems and techniques for refining search results based on information about one or more social groups of the user requesting the search results.

As user herein, social circles are categories to which a user can assign their social networking contacts and better control the distribution and visibility of social networking messages. A social circle may be represented as a data set defining a collection of contacts or individual members that are associated with one another. A social circle may be described from the perspective of an individual that is the center of a particular collection of socially interconnected people, or from the aggregate perspective of a collection of socially interconnected people.

In some examples, a social circle can have narrowly defined boundaries, all of the members of the social circle may be familiar with one another, and permission may be required for a member to join a social circle. In accordance with the subject disclosure, a user of an electronic device may define a social circle, and the social circle, as a data set defining a collection of contacts or individual members, may reflect a real-life social circle of the user.

For example, a user of an electronic device may have different groups of friends, coworkers, and family, and there may be some overlap among those groups (i.e., a coworker who is also considered to be a friend, a family member who is also a coworker). Through the creation and use of social circles, the user can organize and categorize social networking contacts into various different groupings.

The subject disclosure provides for search results refinement or customization based on information about the characteristics of one or more social circles, such as the preferences, interests, needs, likes and dislikes of the social circles. As used herein, a group or a group of individuals or a social circle are interchangeable. As used herein, characteristics of a social circle may be referred to as a group profile, group characteristics, social graph, virtual individual (comprising of the characteristics of a group or social circle) and may be represented as a group vector or group feature vector (as discussed below in more details).

The characteristics of a group of individuals or social circles may be determined by various approaches. For example, the characteristics of a group of individuals may be based on accumulated history of web usage of the individuals in the group. As another example, the characteristics may be based on information provided by the individuals in the group, e.g., interests expressed by the individuals or interests that the individuals are following, etc. The characteristics of the group may be based on information about the group itself, e.g., the purpose, title, or motivation for which the group is formed. The source of the characteristics of groups of individuals may vary without deviating from the scope of this disclosure.

In various aspects, a system is provided for users to select a social lens to apply to their searches, referred to herein as a social lens-based search system. As used herein, a "social lens" refers to a search filter, based on social circles of the user, to be applied to refine a search result. For example, a social lens may be represented as a circle or a lens graphical element that corresponds to a depiction of the search filter, corresponding to a social circle of the user. In some aspects, each social lens available for selection is associated with one social circle of the user performing a search. In other aspects, a social lens may be associated with more than one social circle and of various individuals (e.g., see discussion below about sub-circles).

As an example, in a conventional search system, if a user searches for the query term "rainbow", she may get results for all types of products and information related to the term "rainbow". However, with the subject technology, where the user has a circle of friends whose search histories indicate a bias towards video games (e.g., the user's "gaming" friends group), and the user selects and applies a social lens of her "gaming" friends group to the same "rainbow" query, the results for a video game named "rainbow abc" may be ranked above other search hits resulting from searching the word "rainbow". Applying a social lens for searches may make the search results more useful for a user performing the search.

As another example, if a user searches for the query terms "game cod", she may get different results depending on a selected social lens (thereby identifying a respective group profile) applied to the query. For example, where the user selects and applies a social lens of her "video gaming" friends group to the query for "game cod", then "game" may be interpreted as video games and the results may find synonyms for the term "cod" such as a game called "Centaur-Out-the-Door". On the other hand, if the user selects a social lens for her "hunting" group of friends, then the results for the term "cod" may find synonyms such as "fish" and "trout", etc.

In certain aspects, a user chooses at least one of his or her social circles to serve as a lens for the current search query or search session. The user issues a search query in the context of that social lens. The user is presented with search results based on the social lens applied to it. Applying a social lens may for example result in either the search results being filtered by the characteristics of the selected social group or may result in ranking the search results differently based on the characteristics of the selected social group. Users may be able to choose a different lens and have the search results modified to reflect the newly applied lens or selected social group. Users may also be able to apply multiple lenses, e.g., to get results as either the union or intersection of the results obtained from multiple lenses individually.

In various aspects, a social lens-based search system presents a user with a search box and a list of their accessible social circles. For example, a user may be provided with a list of UI icons, one for each social circle accessible by the user, to select from as a social lens filter to apply to a particular search query or session. The user may then be able to drag the provided UI icon, indicative of a social circle, over a search results' page or section, to indicate that a particular search or search session should be refined (e.g., ranked and/or filtered) by the particular social circle's characteristics. The search results then may reflect the biases, preferences and/or characteristics of the people in that social circle.

In various aspects, a user's selection of a social lens to be applied to a search query or session results in the ranking of the search results based on the weighted characteristics of the group. For example, a particular group's characteristics may be determined to include interests in: sports, video games, and fashion. The weight of the characteristics may be determined to be: 50, 150, and 10 respectively. Then upon a user submitting a query, where that particular group is selected as the social lens to apply to the query, the resulting search hits may be ranked highest for search hits related to video games, second highest for search hits related to sports, third highest for search hits related to fashion, and all remaining search hits may trail this list.

Characteristics and weights for a group or circle may be derived from members of the group. For example, weighted characteristics of a social circle may be determined by analyzing web usage history of members of the social circle or group. The analysis of the social circle may involve studying the accumulated search history and usage patterns for members of the social circle. Analysis of web usage history may include analyzing past click streams, search histories, user endorsements (e.g., "+1s" or likes), or other types of feedback received for members of the social circle to determine the aggregate set of features or characteristics of the group and their associated weight. Group member's biases or preferences may be based on analysis of any other data accessible about group members via a host of applications and sources.

A social circle's characteristics may additionally be determined by studying web usage histories of sub-circles. Sub-circles are other groups that members, of the selected social group to be applied as the search lens, belong to or have access to (See discussion below about FIG. 4 for more details). The sub-circles may be examined upon a user requesting for a different level of social lens application to a search query or session. For example, when a user wants quicker results she may not want the social lens to take into account sub-circles of group members, so as to save on computation time. On the other hand, when a more accurate search is required and computation time is not as much of a concern, the user may request for a "highest" level of search refinement, which may drill down into many sub-circle levels to determine group characteristics. Sub-circle levels to traverse for refining search results may be system configured or based on user preferences.

The aggregate features/characteristics of a group may also be weighted to indicate how strong any particular feature is for the group. The weight of a feature may be based on things like the number of times a particular feature surfaced in web usage history, such as based on search history or on the subsequent click streams of members of the circle (or sub-circles in the case of a "high" level search refinement). The weight may also take into account indications of liking a particular topic (e.g., when a "+1" is provided), etc. supplied by members of the group for a particular hit or search result.

The weight of a feature may also be determined based on the strength of the relationship between the user and a member of the group. The strength of the relationship between the user and a member of the group may be based on the type of relationship (e.g., friend, acquaintance, spouse, family, academic, etc.), or based on how often the user interacts (e.g., via email, chatting, messaging, sharing content, etc.) with the member, etc.

In some aspects, a social lens-based search system is based on a virtual individual. The virtual individual is based on the aggregate of the personalized information of members of a group (e.g., represented as an aggregate feature/characteristics vector. The personalized information for each member and the aggregated virtual individual characteristics may be weighted similarly to as described above. The virtual individual's characteristics are then applied to refine search results.

The list of social circles or lenses that a user can select from may be determined from social networking platforms of the user, having specified groups or circles of the user. Social circles or groups of individuals may be retrieved from any other source that a user of the social lens-based search system has access to, e.g., professional networks, academic circles, interest groups, and any other affiliations that the user has access to.

Circles to apply as a social lens may also be system generated and supplied to the user for selection. For example, the system may generate a "science" circle and a "genius programmer" circle. The circles may be directly associated with weighted features (e.g., science circle may have certain words etc. associated with it). For example, a science circle may have the features or categories of "chemistry", "biology", "physics", "space", "atom", etc. with weights associated for each category or topic. System generated circles may provide a member list for the system generated group, that can be used to derive a weighted feature set (e.g., by analyzing the web usage pattern of the members to derive characteristics for the system defined groups), similar to social groups from social networking platforms applied as lenses for refining search results.

The information about characteristics of groups (whether based on groups from social networking platforms or other groups affiliations of a user, or system defined) may be maintained in various data models or software or mathematical constructs. In certain aspects, an implementation of using known preferences or web search histories of members of a group is used to alter the search results for another user utilizing vectors to store information about group characteristics. For example, characteristics of each member of a social circle may be described using a feature vector. A feature vector for a member may be one way of representing the member's profile. Each dimension of the feature vector may correspond to a vertical, e.g., a category in a taxonomy ("automotive", "space travel", "fashion", "movies", "video games", etc.) The value of each dimension or the weight may correspond to a number of queries issued by that user that have been classified as belonging to the corresponding vertical. The feature vectors for multiple or all users in the circle may be combined to generate a single feature vector for the group, defining the characteristics of that group via verticals and combined values for each vertical.

A feature vector, describing the group characteristics as discussed above, may then be used by a backend search engine to alter the ordering/ranking or filtering of the search results. A feature vector for a group or social circle may be one way of representing the group's or social circle's profile. For example, an initial large set of N results (e.g., N=1000) may be retrieved from a search index in response to a query. Each result may then be compared to the group feature vector, leading to re-ordering based on the group feature vector. In certain aspects, the top M (e.g., M=25) results may then be retrieved in full, including document summaries etc. and supplied to the user.

In various aspects, a user's selection of a social lens to be applied to a search query or session returns those search results where members of the social circle provided a user endorsement for the search hit at some point in their web usage history. In certain aspects, at least one member of the social circle provides a user endorsement (e.g., "+1", "like", etc.) for a search result to be included in the search results delivered to a requesting user.

A social lens may be applied either after or before the query is issued. For example, in certain aspects a user may provide one or more social lenses along with an initial search request. In certain other aspects, a user may initially perform a conventional search (e.g., without applying any social lens) and may subsequently apply one or more social lenses over the result set to refine the search results.

Multiple social lenses may be applied to a search query or search session, resulting in the search being refined by the intersection or union of the multiple social lenses' characteristics, referred to herein as a "layering of social lenses" solution.

In certain aspects, the one or more social lenses applied to a query may be applicable only to a current query executed. In certain aspects, the social lenses applied to a query may continue to be applied for a particular query session. In certain aspects, a user may explicitly clear previously applied social lenses and start queries anew. The search query page or section may provide a visual indication of what social lenses have been or will be applied to the searches.

In some aspects, a selected social lens may not be applied to refine search results based on either system or user configurations. For example, it may not be desirable to refine query search results, based on a selected social lens, for queries considered mature or queries relating to health or financial matters. As such, in some aspects, a selected social lens is not applied to refine query search results.

One advantage of applying social lenses for search refinement is the benefit of accumulated web search behavior applied to search results, for example, to help make search results more meaningful to users searching for information on the World Wide Web.

FIG. 1 illustrates an example of a computer system 100 configured to refine or customize search results based on knowledge about the preferences, interests, likes and dislikes of a group of individuals. As shown, the computer system 100 includes a data repository 110, a server 120, a mobile device 130 and a computing device 140. Data repository 110, although shown as a database, may be any other type of data repository (e.g., a relational database, an object-oriented database, a web application server, a file, or any other data storage) that can maintain and provide data about searches or social groups. The data repository 110, the server 120, the mobile device 130, and the computing device 140 may be configured to communicate with one another via a network 150. The network 150 may include the Internet, an intranet, a local area network, a wide area network, a wired network, a wireless network, a cellular network, a WiFi network, or a virtual private network (VPN).

The data repository 110 may store data (e.g., search content, social group information such as members of a group, social group characteristics and weights, etc.) related to a search system. Data repository 110 may also maintain multiple data indexes as appropriate for searching for various types of data, e.g., a search index to search for content based on search queries and a social group index about individuals in a social group or characteristics of a group of individuals. Information about individuals in a group is provided based on authorization for viewing the social group. In some implementations, the system may provide users an option to opt in or opt out of providing their social group information.

The server 120 may include a module for providing search results and a module for providing information about social groups or refining search results based on social groups, as determined by searching the data repository 110 or other sources. The server 120 may be implemented as a single machine with a single processor, a multi-processor machine, or multiple machines with multiple processors. One example of the server 120 is described in more detail in conjunction with FIG. 2 below.

The mobile device 130 may be a mobile phone, a personal digital assistant (PDA), a tablet computer, a netbook, or a laptop computer. The mobile device 130 may be portable and may often times be carried by a user, for example, in a pocket, a purse, a backpack, or a briefcase. The mobile device 130 may also include a mobile browser or a mobile application configured to request search results based on one or more selected social group or lens or circle from server 120. While only one mobile device 130 is illustrated in FIG. 1, the subject technology may be implemented in conjunction with one or more mobile devices 130.

The computing device 140 may be a laptop computer, a desktop computer, a mobile phone, a personal digital assistant (PDA), a tablet computer, a netbook, a television with one or more processors embedded therein or coupled thereto, a physical machine, or a virtual machine. The computing device 140 may include one or more of a keyboard, a mouse, a display, or a touch screen. The computing device 140 may also include a mobile browser or a mobile application configured to request search results based on one or more selected social lens or group or circle from server 120.

A user of the computing device 140 or mobile device 130 may access the browser or the application on the respective device to request search results, applying a social lens, for display on the client device (e.g. a web page displaying search results based on the social lens). A user of the computing device 140 or mobile device 130 may provide a selected social lens to apply to a search by dragging one or more graphical items, representing one or more social groups that the user has access to, and dropping the dragged graphical item onto, e.g., a search results page. A user may apply more than one social lens to a search results page, thereby aggregating the effect of two or more social groups on the results of a search page.

While each of the data repository 110, the server 120, the mobile device 130, and the computing device 140 are illustrated in FIG. 1 as separate machines, in example aspects, one or more of the data repository 110, the server 120, the mobile device 130, and the computing device 140 may be implemented as a single machine. For example, the functions of the data repository 110 and the server 120 may be implemented within a single machine.

Figure 2:
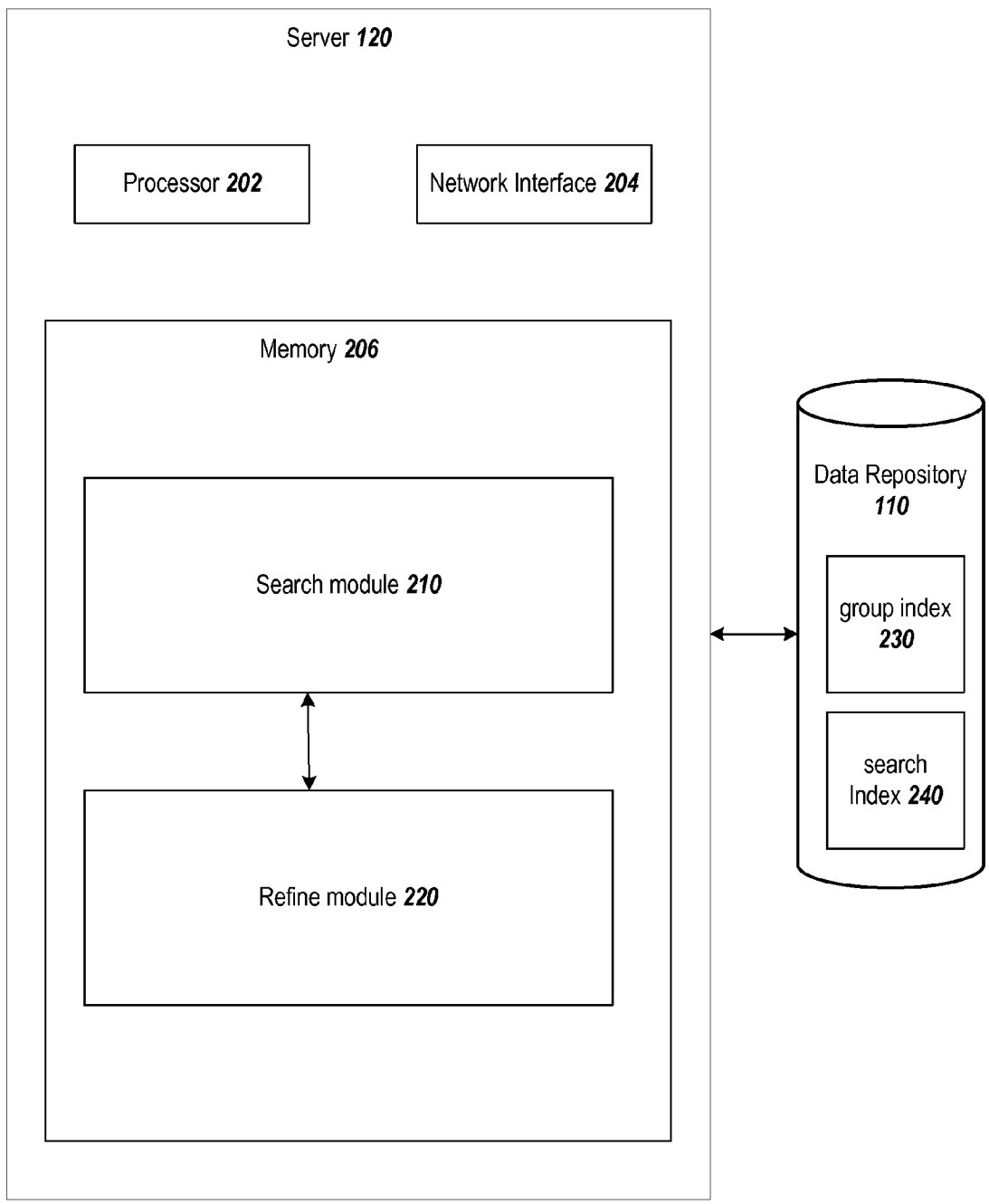
FIG. 2 illustrates an example of the server of FIG. 1 in more detail.

FIG. 2 illustrates an example of the server 120 of FIG. 1 in more detail. As shown, the server 120 includes a processor 202, a network interface 204, and a memory 206. The processor 202 is configured to execute computer instructions that are stored in a computer-readable medium, for example, the memory 206. The processor 202 may be a central processing unit (CPU). While only one processor 202 is illustrated, the server 120 may include multiple processors. Furthermore, while the server 120 is illustrated as a single machine, the server 120 may include multiple machines, or portions of computing power available on the cloud. The network interface 204 is configured to allow the server 120 to transmit and receive data in a network, e.g., network 150 of FIG. 1. The network interface 204 may include one or more network interface cards (NICs). The memory 206 may store data or instructions. As illustrated, the memory 206 includes a search module 210 and a refine module 220, which are implemented by processor 202 executing one or more sequences of instructions stored in memory 206. FIG. 2 also shows a data repository 110 of FIG. 1 having a group index 230 and a search index 240.

Search module 210 is configured to receive, from a computing device (e.g., computing device 140 or mobile device 130), a request for search results. In various aspects, the request for search results includes with it one or more social lenses (e.g., one or more selected groups or circles to filter or rank search results by) to apply on the search results of the requested search. The search module 210 may be configured to communicate with data repository 110 to retrieve search results or hits to search words or queries. The data repository 110 may utilize search index 240 to determine results of a search. For example, search module 210 may receive a search for the word "rainbow" and a social lens for a "gaming" group of the user requesting the search. Search module 210 may communicate with data repository 110 to use its search index 240 to obtain results for the "rainbow" query search. For example, search index 240 may provide 1000 search results for the "rainbow" query.

Search module 210 may be configured to receive a search request and subsequently and separately receive a request to refine a query by one or more social lenses. For example, a user may submit a search for the term "rainbow". Search module 210 then may communicate with data repository 110, using search index 240, to return hits for searches of the term "rainbow". The example 1000 hits as discussed above may be delivered to the requesting user as partial results (e.g., 25 at a time) or may be delivered to the requesting user in one big batch. In either case, search module 210 may subsequently receive a request to refine a previous query (e.g., the "rainbow" query) by one or more social circles (e.g., "gaming" group). Social module 210 may be configured to communicate with refine module 220 to receive either a re-ordered or a filtered search results list, based on the received social lenses, to deliver to the requesting user.

Search module 210 is configured to communicate with refine module 220 to refine search results. For example, search module 210 may provide the query term "rainbow", the social lens provided in the search request of "gaming" group, and the results of searching data repository 110 for the query term "rainbow" (e.g., the example 1000 hits received from search index 240 for query term "rainbow") to refine module 220. Search module 210 is also configured to receive from the refine module 220 the refined search results, based on the one or more social lenses supplied, for delivery to the requesting search user. For example, the 1000 results retrieved for the "rainbow" query from search index 240 may be re-ordered by refine module 220 based on the "gaming" group social lens applied to the 1000 results. In one example, this may lead to hits to owner John Doe's "rainbow abc" video game being provided as the top hits, above hits resulting from other meanings of the word "rainbow" for delivery to the requesting user.

Refine module 220 is configured to receive information from search module 210 about search results and one or more social lenses to apply to search results. Refine module 220 may also be configured to communicate with data repository 110 to receive information about group characteristics, via for example group index 230, to apply to search results it receives from search module 210. In the above example, refine module 220 may query data repository 110's group index 230, supplying to it the "gaming" group identifier. Data repository 110 may supply to refine module 220 a data structure storing information about the characteristics of the "gaming" group supplied to it, This will be described in greater detail below, for example, with respect to feature vectors, in reference to FIG. 6).

One such characteristic may provide information that hits related to "video games" should be order at the top of the search results. Refine module 220 is configured to return the re-ordered search results' list, based on the social lenses provided to it, back to search module 210. Search module 210 then may provide the re-ordered search list to the requesting user. Search module 210 may provide the re-ordered list, chunk-by-chunk, e.g., a certain number of rows or hits at a time may be provided to the user (e.g., provide 25 hits per page to display at the user's front-end application).

Refine module 220 may instead filter results based on the "gaming" group or other social lenses it receives from search module 210. In the above example, the 1000 search results obtained from search module 210, may be filtered down to, e.g., 18 search results having the characteristics of the "gaming" group social lens. In some aspects, refine module 220 is configured to provide the filtered set of search results (e.g., the 18 filtered search hits), based on the one or more social lenses it received from search module 210, back to search module 210 to supply to the requesting user.

Figure 3:
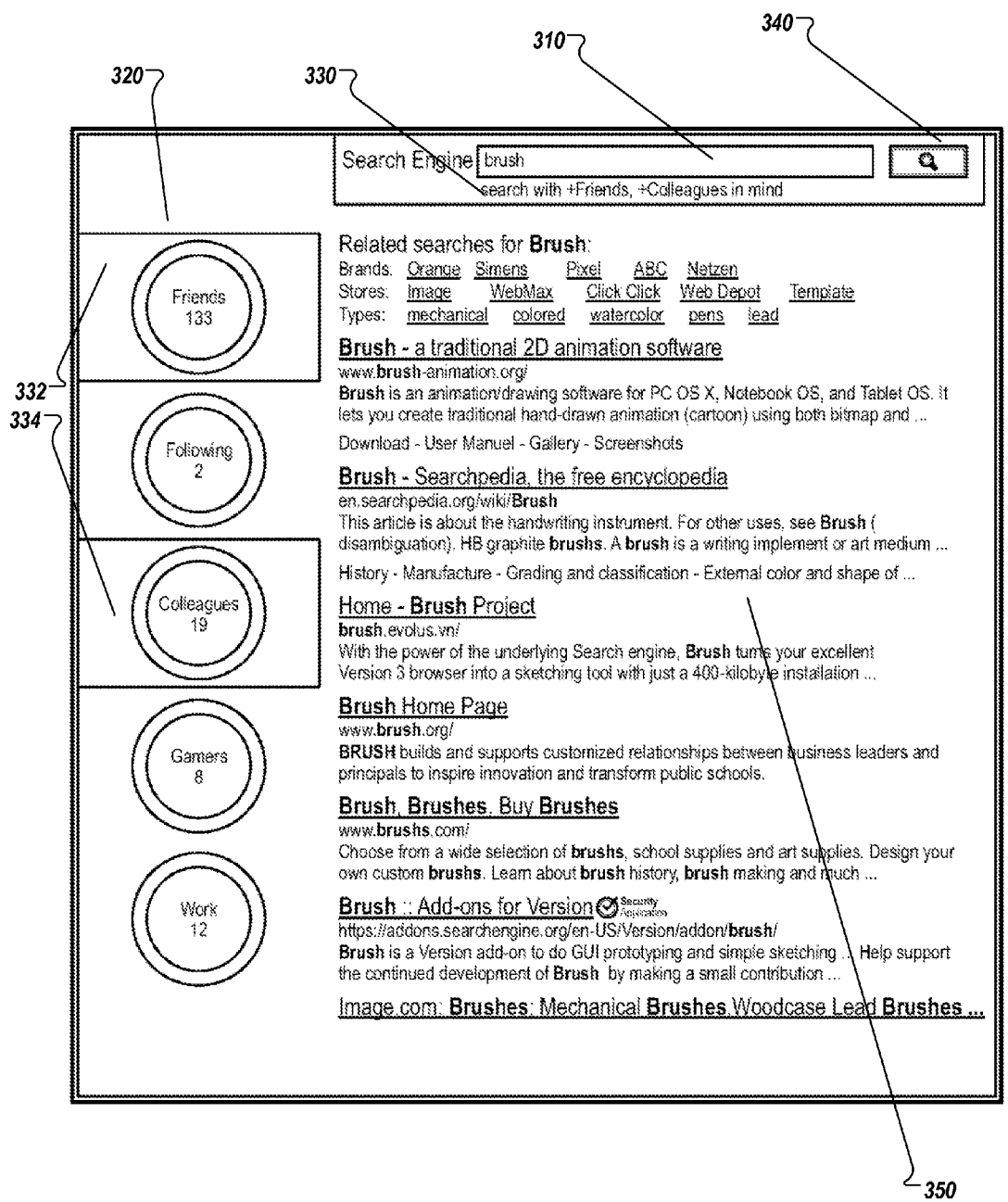
FIG. 3 depicts an example of a search page for a social lens-based search system.

FIG. 3 depicts an example of a search page for a social lens-based search system. FIG. 3 depicts a webpage with a search box 310, a list of social circles for user selection 320, a search results area 350. FIG. 3 also depicts, as an example, the social circles 320 that may be selected to apply to a search, the "Friends 133", "Following 2", "Colleagues 19", "Gamers 8", and "Work 12" circles. The numbers in the example social circles 320 are indicative of the number of members in the social circle identified by the respective name. The source of the social circles in the list 320 may be social networking platforms, professional connection platforms, messaging platforms, system generated groups (e.g., "science", etc. as discussed above), or any other source that provides groups and their characteristics (possibly weighted) information that is accessible to a user of the search system depicted in FIG. 3.

Reference 330 points to an example where the selected social circles to apply to a search include a graphical indication of "+Friends" and "+Colleagues", showing that the selected groups are the "Friends" and the "Colleagues" groups. The selected circles or lenses are also depicted by references 332 and 334, by graphically providing a rectangle around the selected social lenses to apply to the search. Any form of graphical representation to indicate selected social circles may be used without deviating from the scope of this disclosure. In other aspects, an indication about selected social circles may not be provided.

In certain aspects, a user of web page depicted in FIG. 3 may be able to drag one or more of the social circles 320 and drop them onto a section in the results area 350, thereby invoking the application of the dragged-and-dropped circles to refining the search results for section 350. A search may be initiated by pressing on item 340.

The web page of FIG. 3 is one graphical representation of a user interface that enables a social-lens based search system. FIG. 3 is an example and any graphical user interface that provides the capabilities of a social-lens based system as described in this disclosure may be used without deviating from the scope of this disclosure.

Figure 4:
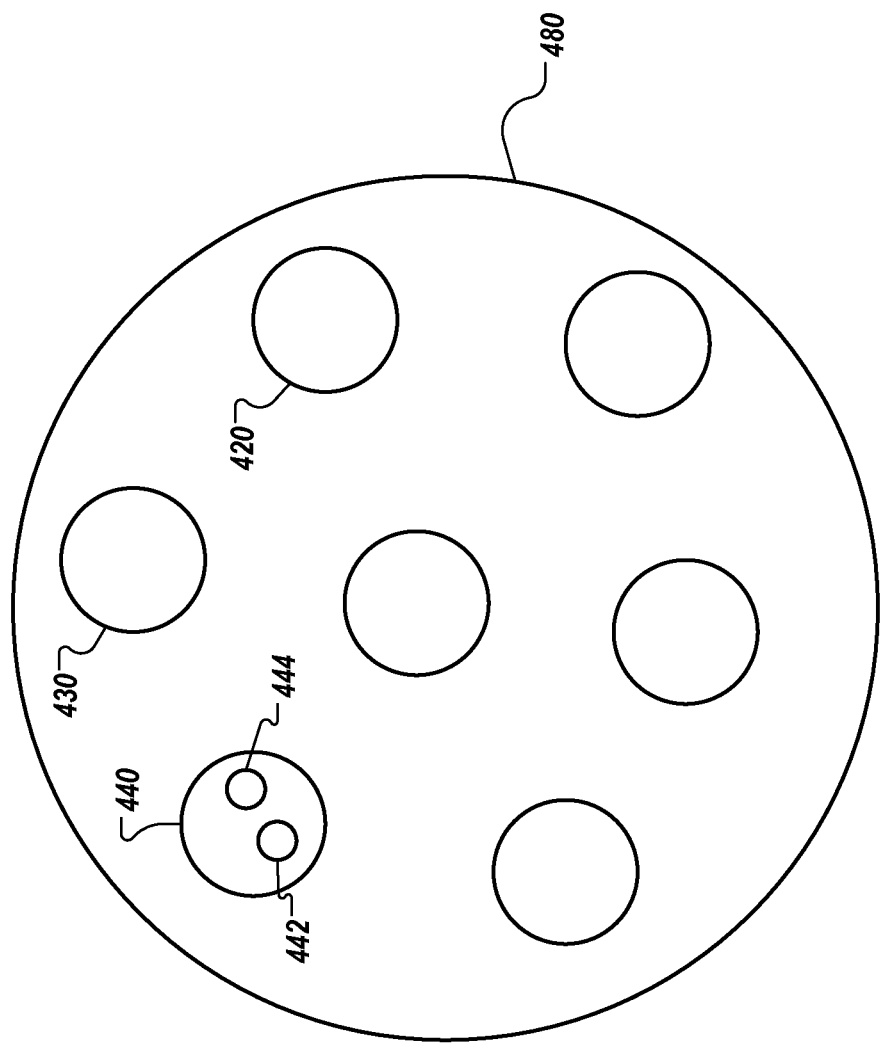
FIG. 4 is a schematic illustrating an example of sub-circles for a social lens-based search system.

FIG. 4 is a schematic illustrating an example of sub-circles for a social lens-based search system. The larger circle 410 represents a selected social circle supplied with a search request for search results' refinement. The internal smaller circles, e.g., 420, 430, and 440 represent sub-circles that one or more members of the circle 410 belong to. For example, circle 410 may be a friends circle of a requesting user, and circles 420, 430, and 440 may be the circle of friends of one or more members of the group 410. Sub-circles 420, 430, and 440 may be any other circle or groups that members of the circle 410 belong to or have access to and the requesting user has access to. Although, circles 420, 430, and 440 are depicted as smaller circles within a selected circle or social lens 410, the representation is not indicative of the actual size of the membership of the sub-circles. For example, circle 420 may comprise of 1000 members, while the selected circle 410 may comprise of 100 members. Circle 420, 430, and 440 are represented inside circle 410, thereby being smaller, merely to illustrate that they are circles accessed via members of the circle 410 and not due to the size of those sub-circles.

In various aspects, a selected circle's (e.g., circle 410) characteristics may be combined with characteristics of sub-circles (e.g., circles 420, 430, and 440), as accessible via members of the selected circle 410, to refine search results by. Sub-circles of sub-circles may also be accessed to further refine query results by, as illustrated by circles 442 and 444. Sub-circles may be queried to as many levels as accessible by the user submitting a search results request. In certain aspects, a user may provide some indication of the level of recursion to apply for refining a query. For example, a user may select a low or no level of recursion when looking for quick results. In another example, a user may select a highest level of recursion when looking for a more customized result, and where a quicker result in not required.

FIG. 4's sub-circles may be used to aggregate a feature vector as discussed in reference to FIG. 6 below. Similarly to how member's or individual's preferences may be aggregated to determine the characteristics of a group, preferences or characteristics of sub-circles (at various levels) may be used to aggregate the characteristics of a group. The aggregated group characteristics then may be used to refine search results.

Figure 5:
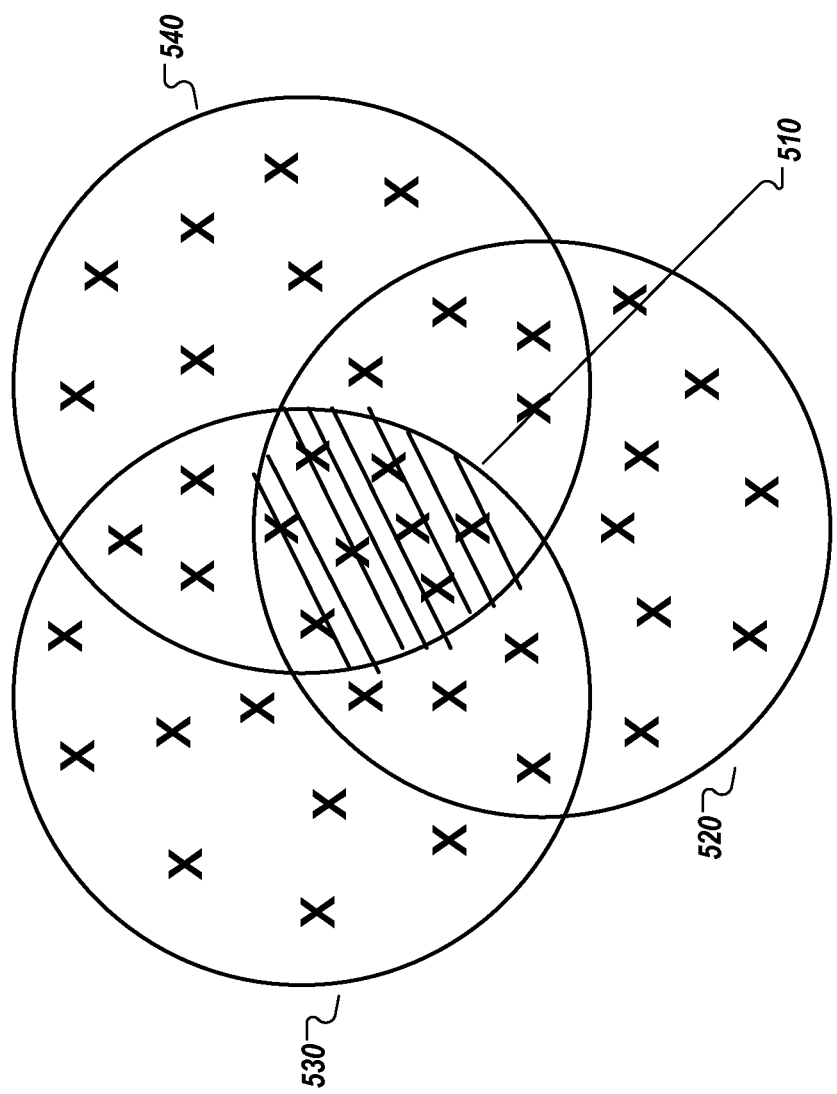
FIG. 5 is a schematic illustrating example strategies for applying multiple social lenses to a search.

In various aspects, a user may select more than one social circle or group to refine search results. For example, as discussed for FIG. 3 above, the example illustrated provides a user's selection of the "Friends" and "Colleagues" social circles to apply to a requested search. FIG. 5 is a schematic illustrating example strategies for applying multiple social lenses to a search. FIG. 5 depicts a Venn diagram illustrating either an intersection or a union as applied to three selected social lenses, as represented by the three circles in FIG. 5. Section 510, depicts the intersection of the illustrated three social circles. In various aspects, the strategy chosen to apply is an intersection strategy, in which case, where multiple social lenses are provided for search refinement, then search results that result as an intersection of applying all three social lenses, as depicted by section 510 having lines in the area, are returned to a requesting user.

In certain aspects, a union strategy is employed where multiple social lenses supplied for search refinement. Sections 520, 530, 540, and 510 illustrate areas represented by "x"s as the union of all three social circles. The results supplied to a requesting user in the union strategy are those search results that may result from applying either one of the lenses, 520, 530, or 540.

FIGS. 6a-6e represent an example of a data construct to store information about characteristics of members of a group and of groups for a social lens-based search system. FIGS. 6a-6d represent feature vectors storing information about various categories and their values for four users or members of a group. For example, FIG. 6a represents a vector for member 1, having the first four categories of "video games", "fashion", "space", and "arts". The values for each respective category in FIG. 6a are 10, 0, 5, and 2. FIG. 6b represents a vector for member 2, having the first four categories of "video games", "fashion", "travel", and "cooking". The values for each respective category in FIG. 6b are 5, 5, 3, and 1. FIG. 6c represents a vector for member 3, having the first four categories of "video games", "novels", "movies", and "cooking". The values for each respective category in FIG. 6c are 20, 2, 6, and 15. FIG. 6d represents a vector for member 4, having the first six categories of "video games", "wine", "arts", "travel", "math", and "programming". The values for each respective category in FIG. 6d are 50, 1, 20, 3, 3, and 150.

The individual member vectors as illustrated in FIGS. 6a-6d are provided as an example. Feature vectors for individuals or members may have any host of categories and may be in any order. The categories for each vector may be supplied by a system or may be learned based on, e.g., web usage patterns of the user for whom the vector is representative. The values associated with a category in a feature vector may represent the number of queries issued, relating to that particular category, by the respective user for which the vector is holding characteristics information. The value may be representative of a user's preference, bias, or liking of a particular category. The value may be derived from a source other than the number of queries issued in the past for a respective category. For example, the value may be based on information about events that a user has attended, or may be supplied by the user to indicate his or her own preferences and associated strengths for those categories or preferences, etc. The values may be user supplied or system generated using various analytics without deviating from the scope of this disclosure.

FIG. 6e represents a combined or aggregated feature vector for the members 1 through member 4 for group 1. FIG. 6e represents the first eleven categories of "video games", "fashion", "space", "arts", "travel", "cooking", "novels", "movies", "wine", "math", and "programming". The values for each respective category in FIG. 6e are 85, 5, 5, 22, 6, 16, 2, 6, 1, 3, and 150. In certain aspects, the values for categories for a group feature vector, as in FIG. 6e, may be a sum of the values for each category from members in the group (e.g., as shown in FIG. 6E).

In certain aspects, the value for a category in a group feature vector may be calculated by taking into account various other attributes, such as the strength of the relationship between a member and the requesting user. For example, if the relationship strength between member 2 to the requesting user, who supplied group 1 as his social filter, is determined to be four times as strong as the relationship of other members of group 1, then the values from FIG. 6b's vector for member 2 may be given four times the value (e.g., resulting in 20, 20, 12, and 4 as the values for each respective category). Any other computation may be used to determine a group feature vector based on member feature vectors without deviating from the scope of this disclosure.

The vectors in FIGS. 6a-6e end with dots to show that the list may continue with any number of features or categories or verticals to capture information about. Categories for any particular feature vector may be different for categories in other feature vectors. Categories may include both system generated categories and machine learned categories (e.g., based on web usage patterns of users).

The represented group vector of FIG. 6e may be used to refine a query search result upon a user selection of group 1 as its social lens. For example, a user may issue a query for the term "rainbow" and ask to apply group 1 as a social lens to refine query results. Based on the feature vector for group 1 provided in FIG. 6e, results of querying the term "rainbow"

may rank "video games" related search hits higher than other search hits due to a relatively high corresponding score of 85 for the "video games" category for group 1. Search hits relating to a category of "programming" are provided at the top level, where group 1 is selected as the social lens, because the value for the "programming" category is the highest at 150 in the illustrated group search vector.

FIGS. 6a-6e are provided as one example of how to represent and hold information about characteristics of individuals and how to calculate and hold information about group characteristics (e.g., using feature vectors). However, any other data model or mathematical construct may be used to store characteristics' information for individuals and their respective groups. Additionally, any other computational technique may be used to combine characteristics' information from members of a group to derive characteristics' and associated strength of the characteristics for the group. Member's vectors may or may not be used in calculating a group vector, e.g., some members may be disregarded where the relationship with the requesting user and the member is determined to be too distant or infrequent in communication. In some aspects, group vectors' characteristics and strengths may be system supplied or a combination of system supplied and derived from user's web usage history.

Figure 7:
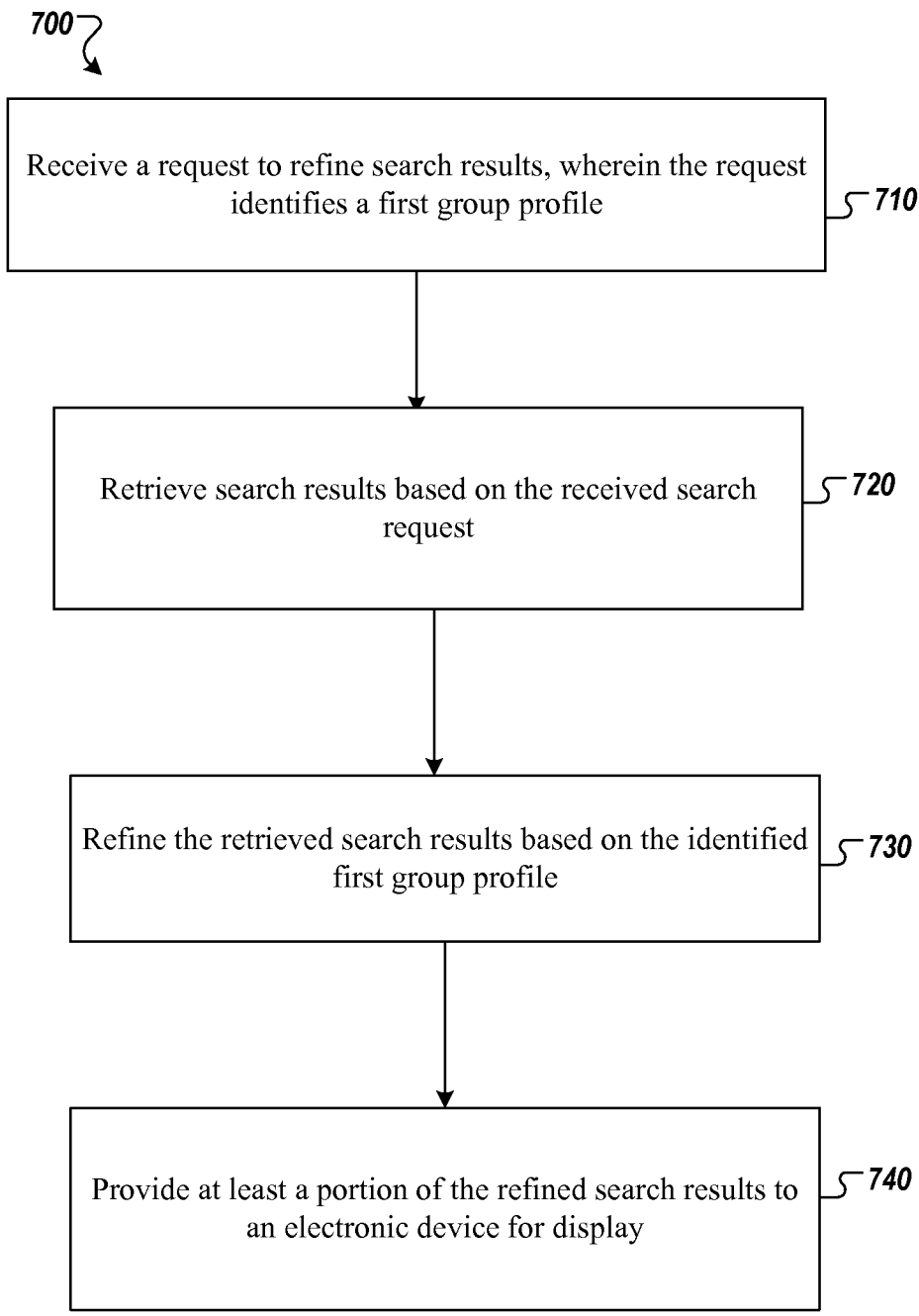
FIG. 7 is flow chart that illustrating an example process for applying a social lens for search results.
Figure 8:
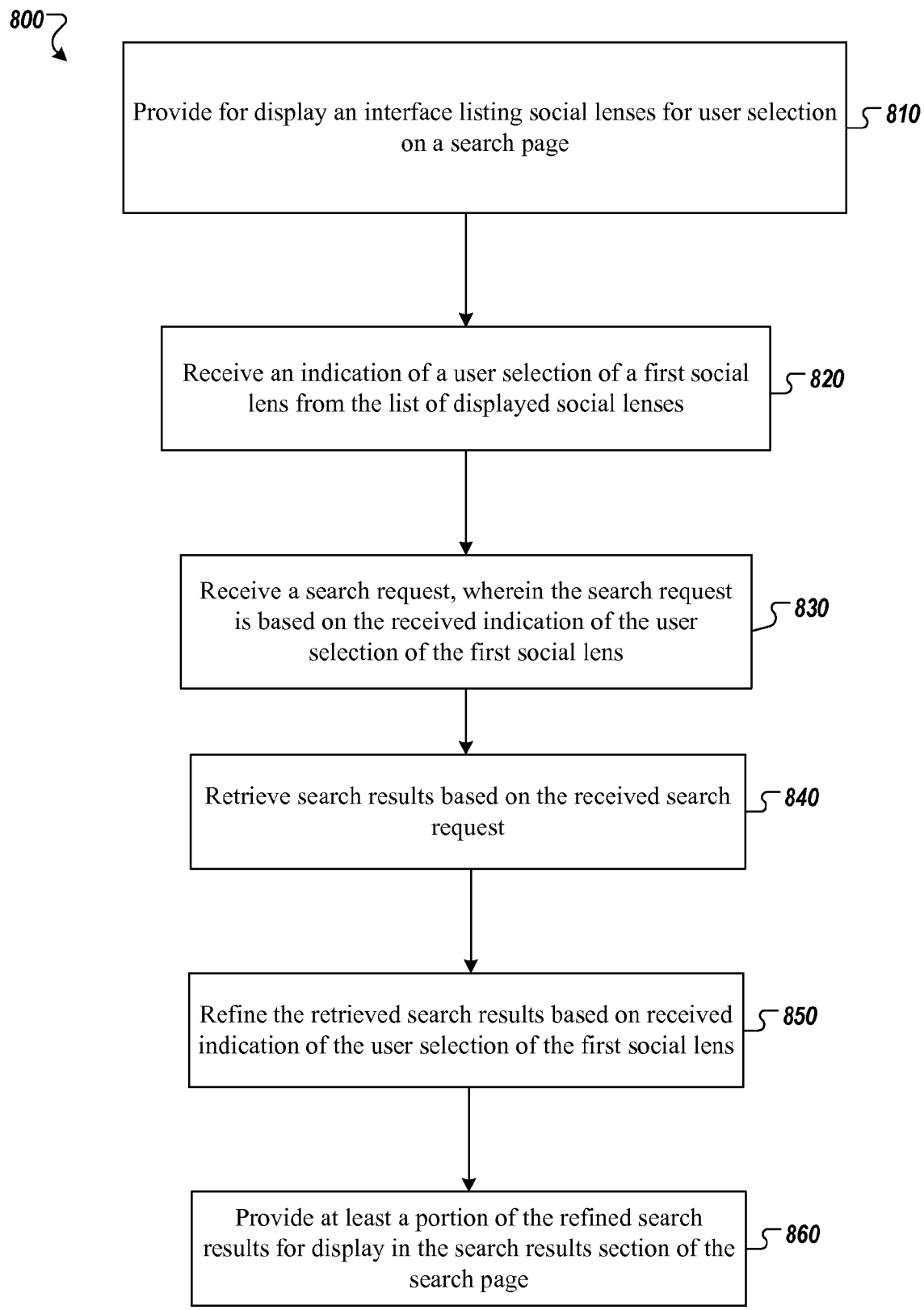
FIG. 8 is flow chart that illustrating another example process for applying a social lens for search results.

FIG. 7 and FIG. 8 are flow charts illustrating example processes for applying a social lens for search results. The processes may be performed, for example, by a system as described in FIG. 2. For clarity of presentation, the description that follows uses the system described in FIG. 2 as an example for describing the processes. However, another system, or combination of systems, may be used to perform the processes.

Process 700 of FIG. 7 starts at step 710, upon receiving a client request to refine search results, wherein the request identifies a first group profile to apply for refining search results. The identified first group profile may correspond to a first social circle, a preset group of contacts of the requesting user within a social network service. The identified first group profile may represent the characteristics of the first social circle. The characteristics of the first social circle may be represented as a group feature vector for the first social circle and may be based on characteristics of one or more individual members of the first social circle, and/or based on sub-circles of the first social circle.

For example, a user on a client device may be on a search web page (for example as described for FIG. 3) and may issue a search request supplying with it one or more social circles available for user selection. The user may supply the selection by a drag-and-drop action or other selection mechanisms, e.g., select from a drop-down list of available social circles. In a first example, a user may enter one or more search terms and select a group or social circle (thereby representing or identifying the first group profile) to refine the search results by and then submit the query, resulting in step 710. Step 710 may be serviced by for example, search module 10 of FIG. 2, that is configured to receive search requests, including social lenses for filtering or ranking search results. In a second example, a user may conduct a conventional search, and subsequently issue a request to refine (the previous) search results by providing a social lens (representing or identifying the first group profile) to rank or filter the previous search results, at step 710.

In either case, at step 720 search results are retrieved based on the received search request. In the first example above, step 720 may result in, e.g., search module 210 retrieving search results by querying a data repository 110 as discussed for FIG. 2. In the second example above, where a previous search query was conducted, step 720 may result in, e.g., search module 210 retrieving the search results for the previous query from, for example, a cache or memory 206 on server 120.

At step 730 the retrieved (e.g., either from cache 206 or from data repository 110) search results of step 720 are refined based on the identified first group profile. The identified first group profile may be a result of a user selection of a social lens on a search page. As discussed for FIG. 2, in one implementation search module 210 may communicate with refine module 220 to refine the search results for step 720. The refining of search results at step 720 may either lead to a re-ordering or re-ranking of search results or may lead to a filtering of search results as described in more details for FIG. 2. In various aspects, the refining of the retrieved search results uses weighted characteristics about the underlying circle or group, or the group profile, in order to re-order or filter the retrieved search results. (See discussion above).

At step 730 the refined search results as determined at step 720 are provided to a client device for display. For example, the results may be displayed in the search results section as discussed in FIG. 3. The results may be provided to the client device in a partial manner, 25 results at a time as discussed above or may be delivered all at once to the client device.

FIG. 8 is a flow chart that shows another example of a process for a social lens-based search system. Process 800 starts at step 810 with providing for display an interface listing social lenses for user selection on a search page, wherein each social lens corresponds to a search filter to be applied to refine a search result, wherein the list of social lenses are displayed in a social lens section of the search page and query search results are displayed in a search results section of the search page. For example, search module 210 of FIG. 2 may supply an HTML page, including JavaScript, that contains information to display a web page at a client device, such as described for FIG. 3. Section 320 of FIG. 3 represents a section for displaying social groups or lenses for user selection and section 350 represents a search results section for displaying the refined search results.

The list of social lenses displayed in the interface, discussed for step 810, may provide each social lens in the list of social lenses to correspond to a social circle. A social circle to which a social lens corresponds may include a preset group of individual members within a social network service or may comprise of individual members in a system generated social circle.

At step 820, an indication of a user selection of a first social lens from the list of displayed lenses is received. A user selection may be received, for example, by JavaScript in an HTML page provided to a client device, containing instructions for a user to be able to select one or more social circles for query refinement. The instructions may include instructions that allow a user to drag-and-drop displayed social circles. The instructions may provide other mechanisms for social circle selection, e.g., a drop-down list from which groups may be selected for refining queries. The instructions at step 820 may be provided for example by search module 210 of FIG. 2.

At step 830, a search request, wherein the search request is based on the received indication of the user selection of the first selected social lens, is received (e.g., by search module 210 of FIG. 2). At step 840, search results are retrieved based on the search request. For example, if a search request is received for a term "rainbow", search module 210 of FIG. 2 may query data repository 110 to obtain search results for the term "rainbow". In some aspects, step 840 may require only retrieving search results from a local cache, e.g., where the search request is for a previously executed query.

At step 850, the retrieved search results are refined based on the received indication of the user selection of the first social lens, for example by search module 210 communicating with refine module 220 of FIG. 2. At step 850, at least a portion of the refined search results are provided for display in the search results section of the search page. Step 850 may provide the data to display for the search results and instructions on how to display the search results. The data provided at step 850 for display as search results may be a subset of all the data retrieved for a query search result (e.g., only 25 search hits may be provided at a time for display a client computing device). Receiving a subsequent request for, for example a next page, may result in a next set of 25 search hits to be provided for display at the client computing device.

Figure 9:
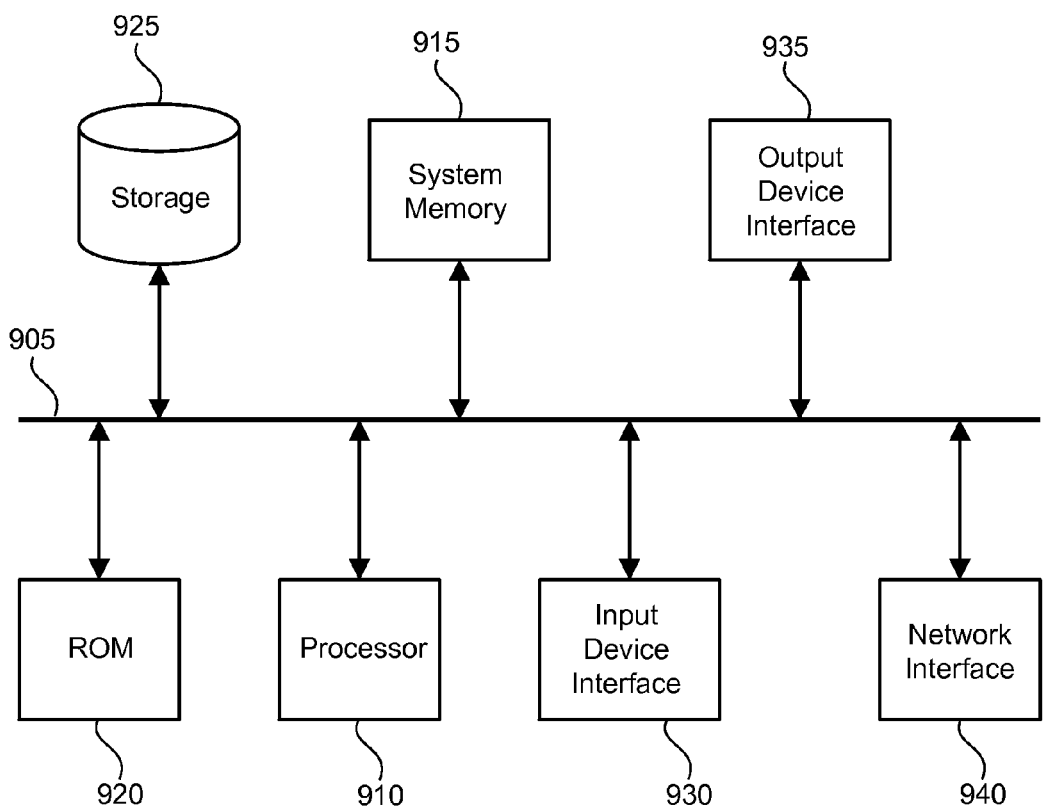
FIG. 9 conceptually illustrates an example electronic system with which some implementations of the subject technology are implemented.

FIG. 9 conceptually illustrates an electronic system 900 with which some implementations of the subject technology are implemented. For example, one or more of the data repository 110, the server 120, mobile device 130 or the client computing device 140 of FIG. 1 may be implemented using the arrangement of the electronic system 900. The electronic system 900 can be a computer (e.g., a mobile phone, PDA), or any other sort of electronic device. Such an electronic system includes various types of computer readable media and interfaces for various other types of computer readable media. Electronic system 900 includes a bus 905, processing unit(s) 910, a system memory 915, a read-only memory 920, a permanent storage device 925, an input device interface 930, an output device interface 935, and a network interface 940.

The bus 905 collectively represents all system, peripheral, and chipset buses that communicatively connect the numerous internal devices of the electronic system 900. For instance, the bus 905 communicatively connects the processing unit(s) 910 with the read-only memory 920, the system memory 915, and the permanent storage device 925.

From these various memory units, the processing unit(s) 910 retrieves instructions to execute and data to process in order to execute the processes of the subject technology. The processing unit(s) can be a single processor or a multi-core processor in different implementations.

The read-only-memory (ROM) 920 stores static data and instructions that are needed by the processing unit(s) 910 and other modules of the electronic system. The permanent storage device 925, on the other hand, is a read-and-write memory device. This device is a non-volatile memory unit that stores instructions and data even when the electronic system 900 is off. Some implementations of the subject technology use a mass-storage device (for example a magnetic or optical disk and its corresponding disk drive) as the permanent storage device 925.

Other implementations use a removable storage device (for example a floppy disk, flash drive, and its corresponding disk drive) as the permanent storage device 925. Like the permanent storage device 925, the system memory 915 is a read-and-write memory device. However, unlike storage device 925, the system memory 915 is a volatile read-and-write memory, such a random access memory. The system memory 915 stores some of the instructions and data that the processor needs at runtime. In some implementations, the processes of the subject technology are stored in the system memory 915, the permanent storage device 925, or the read-only memory 920. For example, the various memory units include instructions for refining search results based on selected social lenses in accordance with some implementations. From these various memory units, the processing unit(s) 910 retrieves instructions to execute and data to process in order to execute the processes of some implementations.

The bus 905 also connects to the input and output device interfaces 930 and 935. The input device interface 930 enables the user to communicate information and select commands to the electronic system. Input devices used with input device interface 930 include, for example, alphanumeric keyboards and pointing devices (also called "cursor control devices"). Output device interfaces 935 enables, for example, the display of images generated by the electronic system 900. Output devices used with output device interface 935 include, for example, printers and display devices, for example cathode ray tubes (CRT) or liquid crystal displays (LCD). Some implementations include devices for example a touchscreen that functions as both input and output devices.

Finally, as shown in FIG. 9, bus 905 also couples electronic system 900 to a network (not shown) through a network interface 940. In this manner, the electronic system 900 can be a part of a network of computers (for example a local area network ("LAN"), a wide area network ("WAN"), or an Intranet, or a network of networks, for example the Internet. Any or all components of electronic system 900 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD–RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and may interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

The detailed description set forth is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may not be required and may not be executed. Some of the steps may be performed in an order different than illustrated. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A computer-implemented method executed by one or more processors, the method comprising:
    providing, by the one or more processors, for display a list of user selectable social lenses on a search page that includes a search results section, wherein each social lens corresponds to a group profile;
    receiving, by the one or more processors:
        an indication of a first user selection of a first social lens from the list of social lenses, and
        a request to refine search results based on the selected first social lens;
    retrieving, by the one or more processors, search results based on a received search request;
    refining, by the one or more processors, the retrieved search results based on the first social lens, the selected first social lens corresponding to a first group profile of characteristics of a first group; and
    providing, by the one or more processors, at least a portion of the refined search results to an electronic device for display.

2. The computer-implemented method of claim 1, wherein the first group profile is based on a first social circle, wherein the first social circle comprises a preset group of contacts of a user within a social network service, and wherein the first group profile is based on one or more individual user profiles of one or more contacts of the preset group.

3. The computer-implemented method of claim 2, wherein the first group profile is based on the weighted characteristics of the first social circle.

4. The computer-implemented method of claim 3, wherein the weighted characteristics of the first social circle is based on weighted characteristics of one or more individual members of the first social circle.

5. The computer-implemented method of claim 4, wherein the weighted characteristics of one or more individual members of the group is based on web usage history of the respective one or more individual members.

6. The computer-implemented method of claim 3, wherein the weighted characteristics of the first social circle is maintained as a feature vector.

7. The computer-implemented method of claim 2, wherein the first group profile is based on one or more sub-circles of the first social circle, wherein the one or more sub-circles comprises of other social circles of one or more individual members of the first social circle.

8. The computer-implemented method of claim 2, wherein the refining of the retrieved search results based on the identified first group profile comprises filtering the retrieved search results based on characteristics of the first social circle.

9. The computer-implemented method of claim 2, wherein the refining the retrieved search results based on the identified first group profile comprises ranking the retrieved search results based on characteristics of the first social circle.

10. The computer-implemented method of claim 1, wherein each social lens in the list of social lenses corresponds to a social circle, wherein the social circle comprises a preset group of individual members within a social network service.

11. The computer-implemented method of claim 1, wherein at least some of the social lenses in the list of social lenses correspond to a system generated social circle, wherein the system generated social circle comprises of a group of individuals created by a computer-system.

12. The computer-implemented method of claim 1, further comprising:
    providing for user selection of one of the displayed social lenses by enabling a user to drag a social lens from the displayed list of social lenses over the search results section to indicate the user's selection of the first social lens for refining the search results.

13. The computer-implemented method of claim 1, further comprising:
    providing for user selection of one of the displayed list of social lenses by enabling a user to select one of the displayed social lenses from a drop-down list of social lenses to indicate the user's selection of the first social lens for refining search results.

14. The computer-implemented method of claim 1, further comprising:
    providing a graphical indication of the user selected first social lens on the search page.

15. The computer-implemented method of claim 1, further comprising:
    receiving a user selection of a second social lens from the list of displayed social lenses, wherein the second social lens corresponds to a second group profile; and
    refining the search results based on the second group profile.

16. The computer-implemented method of claim 15, wherein the refining the search results based on the first group profile and the second group profile comprises taking a union of the refined search results from applying the first and second group profiles individually.

17. The computer-implemented method of claim 15, wherein the refining the search results based on the first group profile and the second group profile comprises taking an intersection of the refined search results from applying the first and second group profiles individually.

18. A non-transitory computer-readable medium storing instructions that when executed by one or more processors causes the one or more processors to perform operations comprising:
    providing for display a list of user selectable social lenses on a search page that includes a search results section, wherein each social lens corresponds to a group profile;
    receiving:
        an indication of a first user selection of a first social lens from the list of social lenses, and
        a request to refine search results based on the selected first social lens;
    retrieving search results based on a received search request;

refining the retrieved search results based on the first social lens, the selected first social lens corresponding to a first group profile of characteristics of a first group; and providing the refined search results to an electronic device for display.

19. A system comprising:

one or more processors; and a data store coupled to the one or more processors having instructions stored thereon which, when executed by the one or more processors, causes the one or more processors to perform operations comprising:

providing, by the one or more processors, for display a list of user selectable social lenses on a search page that includes a search results section, wherein each social lens corresponds to a group profile;

receiving, by the one or more processors:

an indication of a first user selection of a first social lens from the list of social lenses, and a request to refine search results based on the selected first social lens;

retrieving search results based on a received search request;

refining the retrieved search results based on the first social lens, the selected first social lens corresponding to a first group profile of characteristics of a first group; and providing at least a portion of the refined search results to an electronic device for display.

20. The system of claim 19, wherein the first group profile is based on a first social circle, wherein the first social circle comprises a preset group of contacts of a user within a social network service, and wherein the first group profile is based on one or more individual user profiles of one or more contacts of the preset group.

* * * * *